March 30, 1943. P. H. HOLT, 2D., ET AL 2,315,058
PLUG COCK FOR HANDLING POWDERED MATERIALS
Filed April 12, 1940 4 Sheets-Sheet 4

Philetus H. Holt, 2nd
Howard G. Codet
Inventors
By P. L. Young Attorney

Patented Mar. 30, 1943

2,315,058

UNITED STATES PATENT OFFICE 2,315,058

PLUG COCK FOR HANDLING POWDERED MATERIALS

Philetus H. Holt, 2nd, Summit, and Howard G. Codet, Scotch Plains, N. J., assignors to Standard Oil Development Company, a corporation of Delaware Application April 12, 1940, Serial No. 329,208

1 Claim. (Cl. 251—101)

The present invention relates to valves, and more particularly to a plug type valve, in which a substantially frusto-conical valve plug is provided for rotational movement with relation to a cooperating seat in a valve body.

In the handling of finely divided solid materials, such as a dry powdered catalyst, either with or without the fluidizing effect of air or another gaseous medium, or of liquids containing appreciable quantities of finely divided solids, suspended as may be carbon in a residual material from an oil cracking operation, or admixed as a slurry of clay in water or oil, serious operational difficulties are encountered due to packing of the solid materials on and about the seating surfaces of the valves required in the conduit systems through which such materials must be passed. The various means devised to overcome these difficulties, in the past, have been only partially successful.

The present invention is fully set forth in the following specification with particular reference to a valve structure generally termed a "lift cock" valve, in which a mechanical jack is used to raise the valve plug approximately 0.002 inch off its seat, permitting rotational movement to obtain the desired valve setting; the valve plug being reseated thereafter. With the ordinary lift cock, the lifting of the plug from its seat permits the conveyed material to fill the annular space between the plug and the seat, and when again turned down, this thin layer of solid particles intervenes between the seating surfaces. In purely liquid systems, or those in which the concentration of solid particles is low, the intervening layer is readily displaced by compression when the valve is set. In systems handling substantial amounts of solid materials, however, the intervening layer is not squeezed out and soon builds up, as a coating, to the point where it seriously interferes with the proper seating of the valve plug. Its effect may either be to raise the plug so far off the seat as to permit by-pass below, or, by reason of a partial breakdown of the impacted coating, to result in channeling thereof, permitting by-pass of the conveyed material between the plug and its seat in the valve body.

It is an object of this invention to provide a valve structure suitable for use in conduit systems, of the type set forth above, which will not be subject to packing, or to excessive wear of the valve surfaces by interfacial abrasion of the solid materials conveyed therethrough. It is also an object of the invention to provide a valve structure in which movement of the valve plug serves to clean the seat therefor. These and other objects of the invention may be readily appreciated from the following specification, when read in conjunction with the accompanying drawings, in which.

Figure 1:
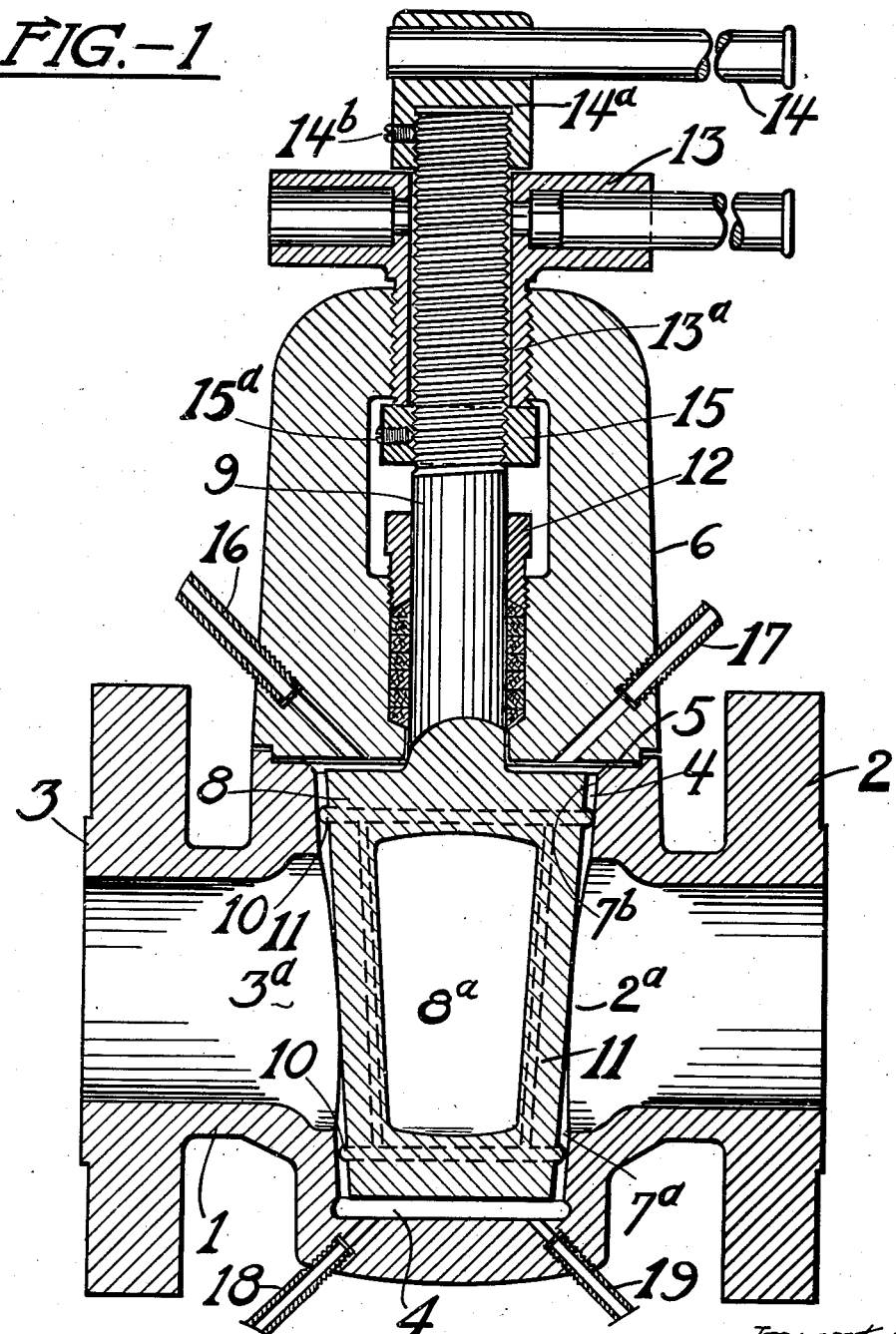
Fig. 1 is a vertical longitudinal section through a plug type valve.

With reference to the drawings, the numeral 1 designates a valve body having a flanged inlet 2 and a flanged outlet 3, each communicating with a valve chamber 4, by means of ports 2a and 3a, respectively. The valve chamber 4 opens outwardly through the upper portion of the body 1 which has an annular portion formed peripherally of the opening, and having a seat 5 adapted to receive the valve bonnet 6. The bonnet may be secured in fluid-tight relation to the seat by any conventional means. The lower portion of the valve body 1 is so formed as to permit the valve chamber to be extended downwardly therein below the ports 2a and 3a. forming an annular valve seating surface 7a. A similar seating surface above the entrance and exit openings is provided within the annular portion 5, as at 7b. The valve chamber 4, including those portions within the upper and lower seating surfaces, has a tapered shape, as the interior of a hollow frustum of a cone, the inner wall of the valve body forming the chamber 4, being machined to provide a smoothly tapered surface, broken only by the inlet and outlet valve ports 2a and 3a.

Seated in the chamber 4 is a valve plug 8, having a stem 9 extending upwardly through the bonnet 6. The plug 8 is also of tapered, frusto-conical form, the angle of incidence being the same as that of the valve chamber walls, although as shown, the dimensions of the plug are such as to provide an annular space between it and the chamber walls when the plug is fully inserted. A passageway 8a laterally through the plug provides for flow of the conveyed materials when aligned with the valve ports. Seating of the plug 8 in the valve chamber 4 is obtained by means of the annular ridge portions or ribs 10 disposed above and below the lateral passageway in the plug, and by longitudinal ridge portions or ribs 11, disposed laterally of the passageway at each end thereof, these longitudinal ribs being spaced approximately 90° one from the other. The ribs 10 and 11 are provided of such thickness as to make fluid-tight contact with the valve chamber wall surface when the plug 8 is fully inserted and set in the valve chamber.

As indicated above, the valve illustrated is of the "lift cock" type in which provision is made to lift the valve plug from its seat before it is turned. As shown, the valve stem 9 extends upwardly through a passageway in the bonnet, a fluid-tight joint being maintained around the stem by means of packing gland 12. The upper end of the stem is threaded and extends concentrically through a passageway in a sleeve portion 13a of a jack-wheel 13, the sleeve being threaded into a corresponding passage in the top of the bonnet 6, and of such length that when fully turned down the sleeve end will project beyond the lower end of the bonnet passageway for not less than .002 of an inch. A portion of the upper end of the stem 9 extends above the jack-wheel 13 and to this is secured the handwheel or valve-wheel 14, by means of the hollow threaded boss 14a. The set screw 14b maintains a fixed relationship between the valve-wheel and stem 9. Within the bonnet, and below the jack-wheel sleeve 13a, a collar member 15 is mounted on the stem 9. The collar 15 may be adjusted to any desired relationship with the sleeve end, or the inner surface of the upper end of the bonnet 6, and so maintained by means of the set screw 15a.

Proper operation of the valve is largely dependent upon the relationship established in the assembly of the jack-wheel 13, the valve-wheel 14, and the collar 15, it being desirable that the distance between the collar 15 and the lower end of the hub of valve-wheel 14 be at least .002 of an inch greater than the over-all length of the jack-wheel sleeve 13a. In setting up these elements, with relation to the bonnet 6 and valve stem 9, the collar 15 should be threaded on the stem 9, as it is passed upward through the packing gland in the bonnet 6, and turned down all the way on the stem, which will then extend through the upper bonnet passageway. The bonnet may then be applied and secured to the valve body, and the valve plug lightly seated by manual pressure on the valve stem. The collar should be adjusted on the valve stem into closely spaced relation to the lower end of the passageway through the upper end of the bonnet, the space between them being adjusted to not less than .002 of an inch. The jack-wheel sleeve 13a should then be inserted and threaded through the passageway until its lower end firmly engages the collar 15, securely seating the valve plug in its seat. The set screw 15a may now be tightened to fix the position of the collar on stem 9. With these elements in place, the handwheel 14 may be applied to the upper end of the stem 9, and threaded on until the lower end of the hub 14a lightly engages the upper surface of the jack-wheel 13. It is sometimes desirable that a small amount of play be provided in the assembly, and this may be achieved by adjusting the valve-wheel 14 on the stem 9 so that its hub 14a be in slightly spaced relation to the upper end of the sleeve 13a. When the assembly is thus completed, the set screw 14b is tightened. Other steps may be followed to accomplish the desired relationship, but that which is set forth above illustrates a preferred method.

In order to prevent packing of material in the valve chamber above and below the valve plug, means are provided for scavenging these spaces after each movement of the plug. Such means may consist of lines 16 and 17 communicating with the upper portion of the chamber 4 through the bonnet 6 and lines 18 and 19 communicating with the lower portion of the chamber through the lower wall of valve body 1.

In use, to open or close the valve, the jack-wheel 13 is first turned so as to partially withdraw the sleeve 13a from its engagement with the bonnet moving it upward against the hub of the valve wheel, to unseat the plug to the extent permitted by the adjustment of member 15. The plug being unseated, the valve wheel 14 is turned so as to open or close the passage through the valve, and then, by means of the jack-wheel, in engagement with the stop member 15, the plug is again firmly seated in the chamber.

During the lifting of the plug from its seat, a small amount of the conveyed material will enter the valve chamber above and below the valve plug. To flush and clean out this material, steam or another gaseous material, or in some instances, even a liquid material, may be injected by means of lines 16 and 18 after the plug has been re-inserted or seated. The accumulated material and the flushing medium may be discharged by way of lines 17 and 19. Alternatively, it may be desirable to operate the valve under such conditions as to make it undesirable to permit the conveyed material to enter the areas above and below the valve plug. In such instance, the lines 17 and 19 may be closed by suitable valves therein, and a constant pressure exerted through the lines 16 and 18. This pressure should be somewhat higher than that existing in the respective conduit portions, and will substantially avoid by-passing of the plug, during such stages of operation during which it is not fully seated.

It should also be obvious from the foregoing description and the drawings, that by the construction set forth, a valve structure is provided in which the valve plug is so formed as to prevent the adherence of solid materials to the walls of the valve chamber or to the plug to such extent as to prevent proper seating. In lifting the plug, and in returning it to its seat, the ribs 10 exert a scraping action on the walls of the chamber which will remove any adhering solids. Likewise, when the plug has been only slightly lifted, rotation by means of the valve wheel 14 produces a similar effect through the longitudinal ribs 11.

Figure 2:
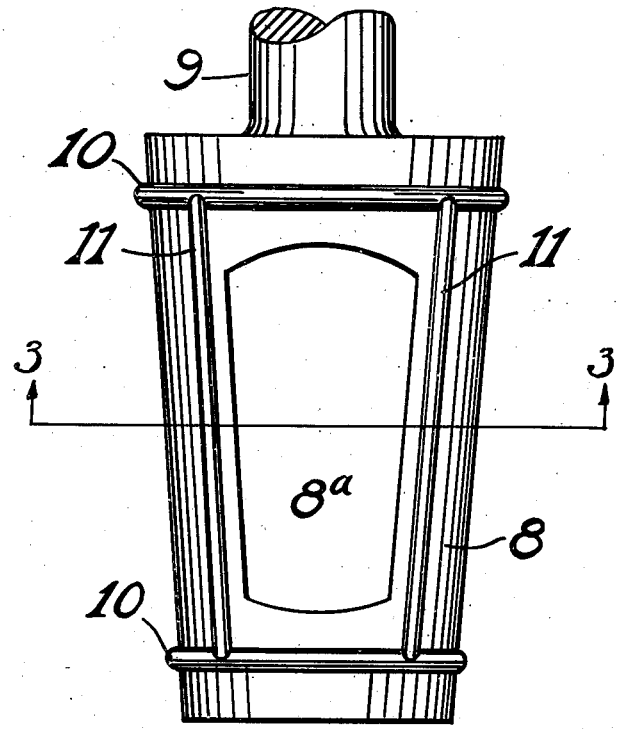
Fig. 2 is a side elevation of the valve plug, slightly enlarged.
Figure 3:
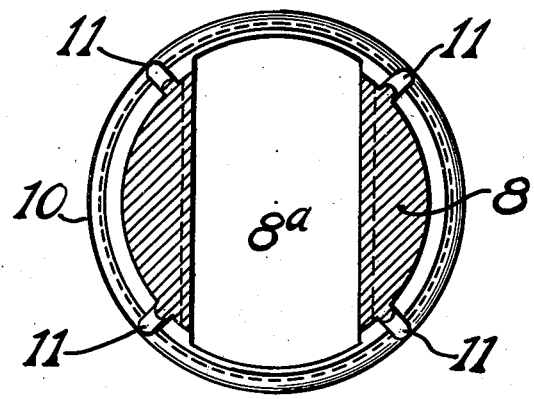
Fig. 3 is a horizontal section through the valve plug along the line 3—3 of Fig. 2.
Figure 4:
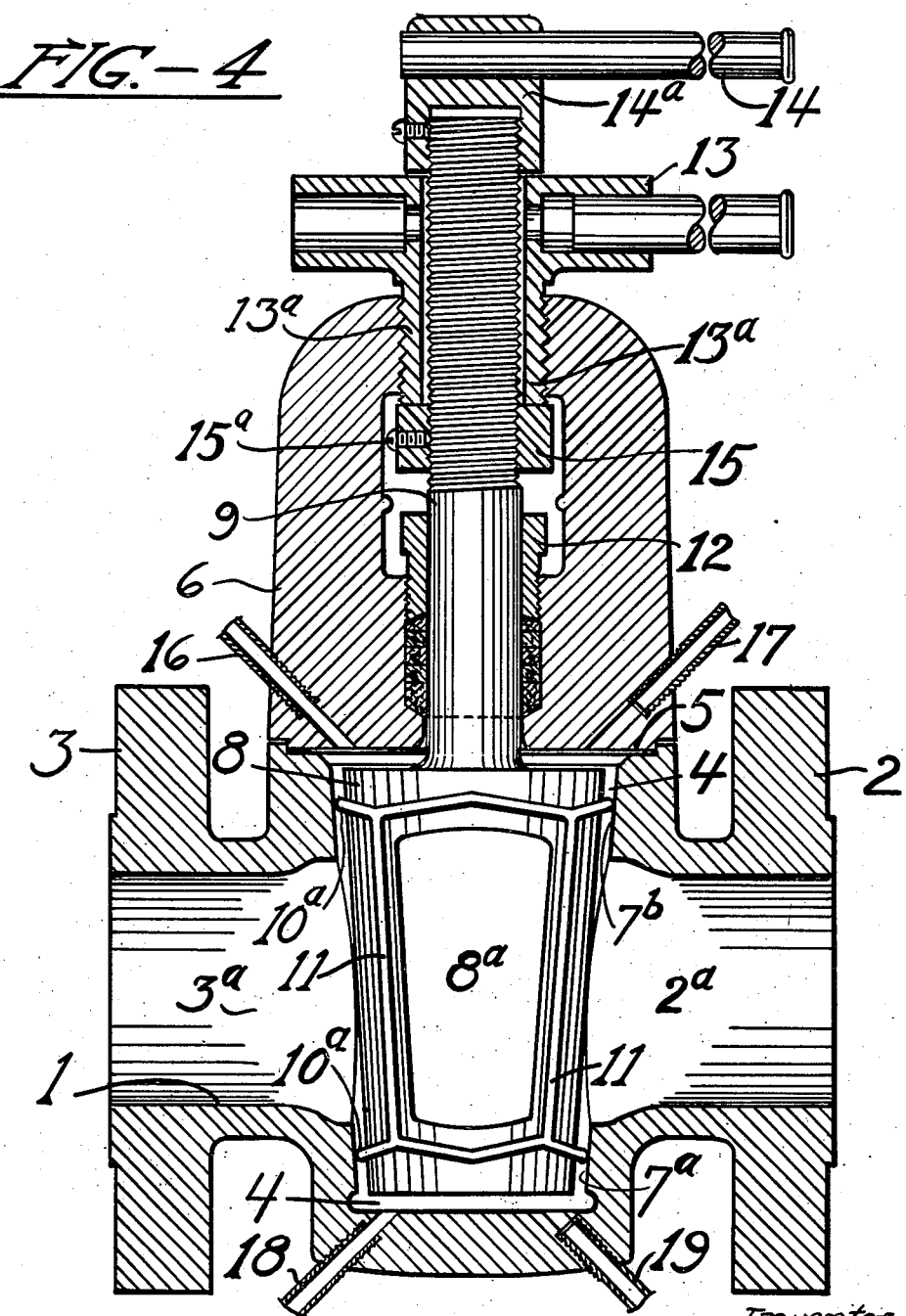
Fig. 4 is a side elevation of an alternate form of valve plug.

The self-cleaning effect produced by the ribs 10 and 11, as illustrated in Figs. 1 to 3 inclusive, is greatly enhanced when the annular ribs 10 are of a sinuous or serpentine conformation. The use of sinuous, annular ribs is illustrated in Fig. 4, the annular rib portions being designated by the numeral 10a.

In this connection, it is preferable that the plug stem be provided for rotation in one direction only so as to prevent stagnation of material in the areas defined by the longitudinal ribs.

Figure 5:
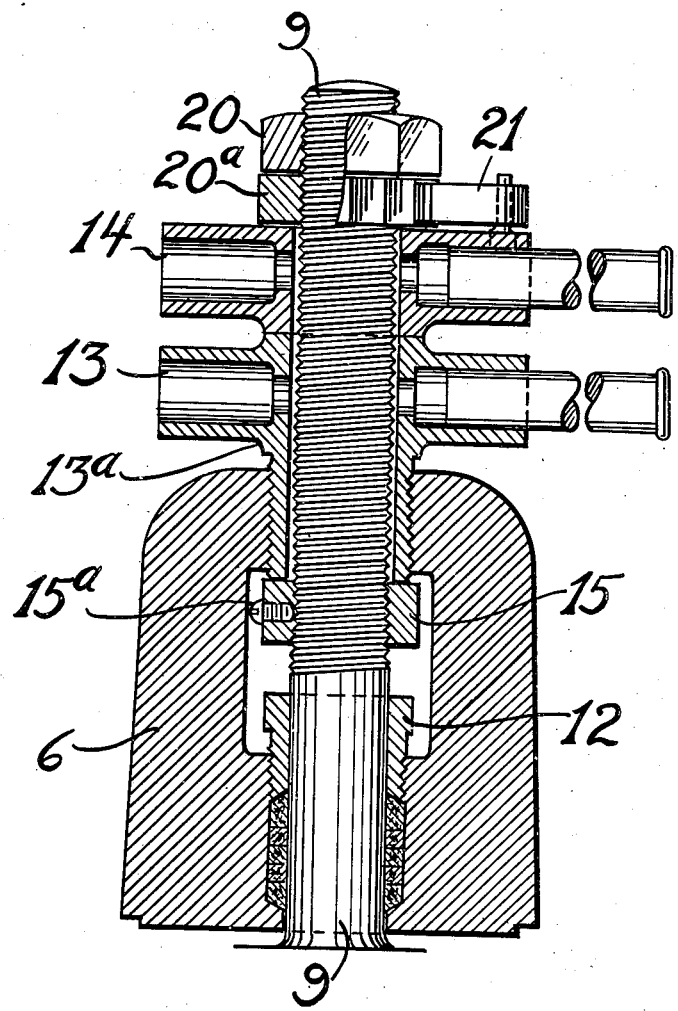
Fig. 5 is a side elevation showing an alternate form of valve operating mechanism.

As shown in Fig. 5, the desired result may be accomplished by means of a ratchet connection between the valve wheel and the stem. In this construction, the valve wheel 14 is freely supported on the stem 9, which extends upwardly beyond the stem and bears a ratchet nut 19 and a lock nut 20. A spring operated ratchet pawl 21 is secured to the hub of the wheel 14 for engagement with the ratchet nut. Likewise a double pawl arrangement may be provided so that the direction of one-way rotation may be alternated as desired in order to equalize wear on the seating surfaces of the plug.

Various other modifications of the structure set forth may be made without departing from the inventive concept. For example, the ribs 10 and 11 may be of a metal dissimilar from that of the valve plug, being set into the plug surface in any conventional or desired manner; other means may be provided for lifting and rotating the valve plug than shown, and means may be provided for positive flushing of the plug areas laterally of the passage as defined by the longitudinal ribs 11. Accordingly, it is not intended that the invention shall be limited to any specific disclosure set forth for the purpose of illustration, but only by the appended claim.

We claim:

A valve structure, comprising a valve body, a valve chamber in said body, a valve plug in said chamber disposed in annularly spaced relation to the chamber walls, upper and lower sinuous annular rib portions at the upper and lower ends respectively of said plug, and longitudinal rib portions disposed in spaced relation peripherally of the plug connecting said upper and lower annular ribs, said rib portions engaging the chamber walls in fluid-tight relation when the plug is seated.

PHILETUS H. HOLT, 2ND.
HOWARD G. CODET.